United States Patent [19]

Fassauer

[11] Patent Number: 5,010,716
[45] Date of Patent: Apr. 30, 1991

[54] AIR-FLOATED CUTTING APPARATUS WITH OVERHEAD GRASS CATCHER

[76] Inventor: Arthur L. Fassauer, 420 Foster La., Canyon, Tex. 79015

[21] Appl. No.: 445,460

[22] Filed: Dec. 4, 1989

Related U.S. Application Data

[63] Continuation-in-part of Ser. No. 395,799, Aug. 18, 1989, abandoned.

[51] Int. Cl.$^5$ .............................................. A01D 75/00
[52] U.S. Cl. ...................................... 56/12.1; 56/194; 56/202
[58] Field of Search ................... 56/12.1, 12.8, 194, 56/198, 199, 200, 202–205

[56] References Cited

U.S. PATENT DOCUMENTS

| | | | |
|---|---|---|---|
| 3,112,597 | 12/1963 | Heth et al. | 56/194 |
| 3,517,493 | 6/1970 | Kiteley | 56/194 |
| 3,706,189 | 12/1972 | Rutherford | 56/202 X |
| 4,345,418 | 8/1982 | Arizpe | 56/202 |
| 4,631,909 | 12/1986 | McLane | 56/202 |
| 4,738,086 | 4/1988 | Dunn | 56/12.8 |

Primary Examiner—Thuy M. Bui
Attorney, Agent, or Firm—Ross, Howison, Clapp & Korn

[57] ABSTRACT

A cutting apparatus with an overhead grass catcher includes a housing (10) for discharging grass clippings at a high pneumatically volumetric flow through a discharge duct (14). A conduit (22) diverts the flow of grass clippings at an angle of greater than 90° with respect to the cutting surface of the mower. The grass clippings are discharged through a discharge port (24) into a grass catcher (30). The grass catcher (30) is disposed on a support (25) that is disposed over the central axis of the mower. The support (25) is anchored onto the handle (16) of the mower. An opening is disposed on a flange (38) with a flexible gasket (40) operable to fit over the discharge duct (24). The opposite end of the grass catcher (30) is securely fitted within an end cap (28), which end cap (28) is fixedly attached to the opposite end of the support (25) from the handle (16). The handle (16) can therefore be tilted up to disengage the opening in the grass catcher (30) from the discharge port (24). The grass catcher (30) can then be lifted off of the support (25) with a handle (42).

25 Claims, 3 Drawing Sheets

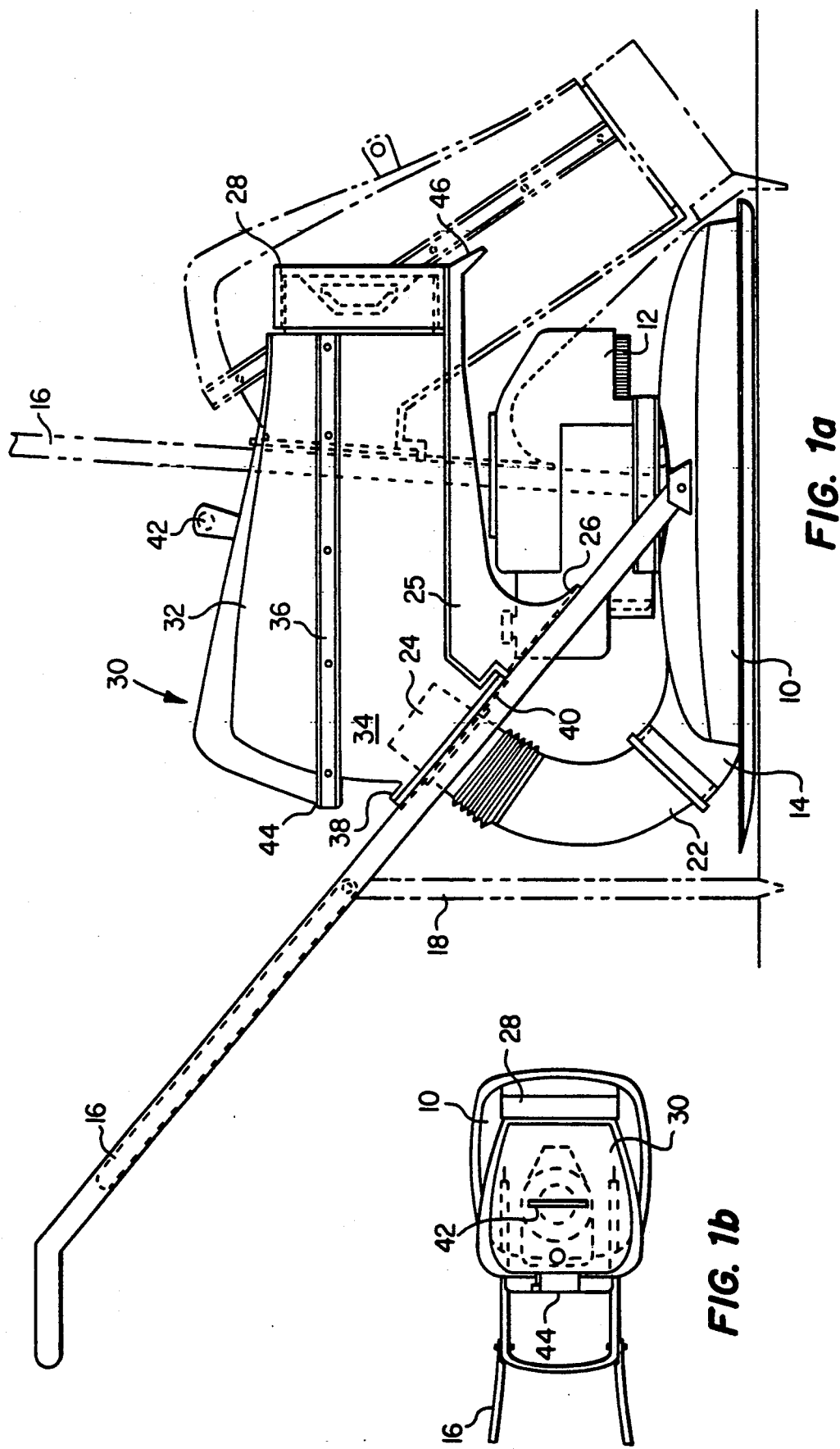

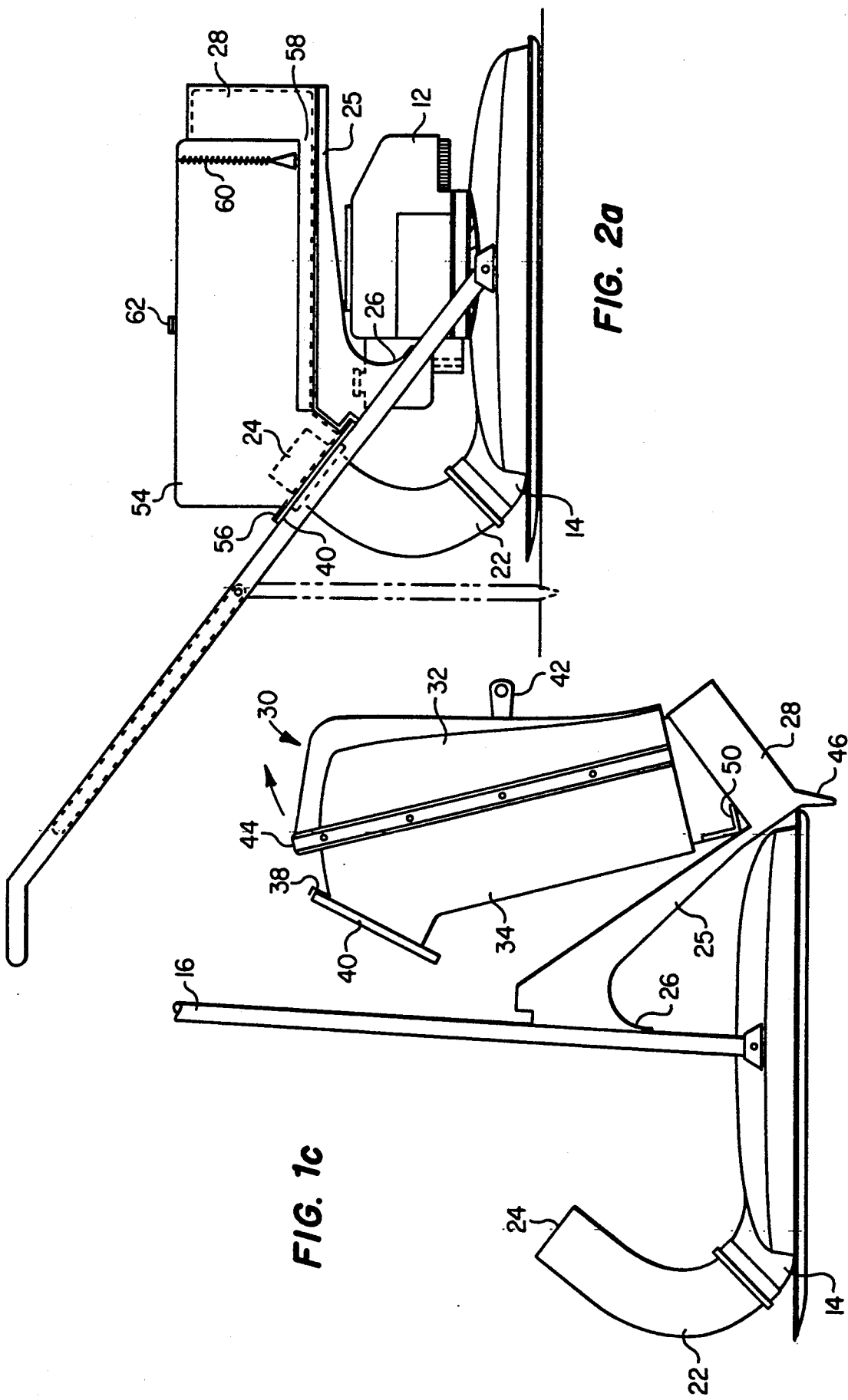

AIR-FLOATED CUTTING APPARATUS WITH OVERHEAD GRASS CATCHER

CROSS REFERENCE TO RELATED APPLICATIONS

This application is a continuation in part of U.S. patent Ser. No. 395,799, filed Aug. 18, 1989, now abandoned, which is incorporated herein by reference.

TECHNICAL FIELD OF THE INVENTION

The present invention pertains in general to grass cutting apparatus, and more particularly, to the receptacle for containing the grass clippings.

BACKGROUND OF THE INVENTION

Devices that are utilized for cutting lawns and the such generate a certain amount of clippings. These clippings are either distributed back onto the lawn from which they are obtained or they are routed to a receptacle. This is typically in the form of a grass catcher.

Conventional cutting apparatus such as lawn mowers, utilize several different types of grass catchers. In one type, the grass catcher is located on the side and directed back toward the rear of the mower. These are typically used with side discharge mowers. In a side discharge mower, a cavity is formed in the mower compartment that allows the grass to be discharged as a result of the centrifugal force of the blade and the upward flow of air through the mower compartment. Since the blade imparts a centrifugal force to the clippings, they are discharged out the side of the mower and toward the rear. One problem that exists with side discharge mowers is the speed at which the clippings are discharged out the side discharge port and also the cumbersome nature of the grass catcher.

Due to the low speed at which clippings are being discharged from the mower compartment, the grass catcher typically must be placed in line with the discharge port. If too much of an angle is placed between the discharge port and the grass catcher, the grass will tend to clump at the neck of the grass catcher. This creates a backpressure which defeats the discharge operation.

Another type of grass catcher that has been utilized is a rear grass catcher. In this type of grass catcher, the port for discharging the grass is disposed on the side and upper surface of the mowing compartment and toward the rear. The grass is therefore centrifugally circulated in the mowing compartment to the peripheral edge thereof, upward and out the discharge port in the direction of rotation of the blade. A sufficient amount of air flow is provided to push the grass in generally the same direction up into the top of the grass catcher. However, the grass catcher is still operable to be disposed in line with the discharge port and the direction of air flow. As was the case with the side discharge grass catcher, the pathway between the discharge port and the grass catcher must be relatively unimpeded and in a straight line. In this manner, the grass can essentially fall into the grass catcher when it reaches it. Typically, the speed of the grass clippings when they reach the rearmost portion of the grass catcher is essentially zero. Therefore, if the grass clumps toward the front of the grass catcher, the grass entering the grass catcher does not have sufficient force to push this grass back into the rear of the grass catcher, and therefore, premature filling of the bag will occur.

One of the prime disadvantages with present grass catchers is the speed with which the grass clippings are discharged from the mower. Since conventional mowers rely upon the blade to determine the discharge rate of the grass clippings, a large discharge port is required and a relatively low discharge rate is present. Conventional systems require the grass catcher to be placed essentially in line with the discharge port, resulting in unwieldy locations for the grass catcher.

SUMMARY OF THE INVENTION

The present invention disclosed and claimed herein comprises a cutting apparatus with a grass catcher for clippings. The apparatus includes a housing for moving along the surface of the grass. A cutting mechanism is provided in the housing for cutting the grass and a primary discharge port is provided for communicating between the interior of the housing and the exterior thereof. The primary discharge port is disposed at an angle of less than 45° from the surface of the grass. A discharging device is provided interior to the housing for discharging the grass clippings through the primary discharge port. The clippings are discharged at a defined volumetric rate that is tolerant to back pressure. A diverter is provided for diverting the clippings from the primary discharge port to a secondary discharge port, the secondary discharge port oriented at an angle greater than 90° relative to the surface of the grass. A substantially sealed receptacle is provided, having an inlet port for interfacing with the discharge port the receptacle for holding the clippings. A support bracket is provided for supporting the receptacle relative to the housing.

In another aspect of the present invention, the support bracket is operable to dispose the receptacle directly over the housing and in a plane parallel to the surface of the grass. A diverter is operable to route the clippings from the primary discharge port into the receptacle and directed toward the central axis of the housing.

In yet another aspect of the present invention, a handle is provided that has two protrusions extending downward therefrom and operable to pivot on either side of the housing, the housing having a motor disposed centrally with respect thereto and on the upper surface. The support bracket includes a flat support plate that is anchored on one end thereof to the handle such that when the handle is in the operating position, the support plate is parallel to the surface of the grass and extends over the motor. The receptacle includes a container having at least one open end. The container has a flange disposed about the open end for receiving the secondary discharge port therein. A sealing device is provided around the flange to seal the space between the flange and the secondary discharge port. A securing device is provided on the support plate to secure the container thereto.

In the further aspect of the present invention, the container comprises a rigid housing that has the flange formed as an integral part thereof at one end with an access opening at the other end thereof, the access opening allowing clippings to be retrieved therefrom. The securing portion of the support plate is comprised of an end cap having a cavity formed therein. The end cap is disposed at the forwardmost portion of the support plate and extending upward therefrom with the cavity therein facing rearward. The cavity is dimensioned to receive the access opening of the container and form a seal therewith. In operation, the handle is pivoted upward to an erect position, pulling the flange and the sealing device away from the secondary discharge port. The rigid housing can then be rotated away from the support plate, pulling the access opening out of the end cap.

In a yet further aspect of the present invention, a protrusion is provided on the forwardmost edge of the support plate and extending outward and downward. When the handle is pivoted to a vertical position, the protrusion is positioned in front of the housing and anchored into the ground to provide a stabilizing operation.

BRIEF DESCRIPTION OF THE DRAWINGS

For a more complete understanding of the present invention and the advantages thereof, reference is now made to the following description taken in conjunction with the accompanying Drawings in which:

FIGS. 1a and 1b illustrate a perspective view and top view, respectively, of the cutting apparatus of the present invention with the grass catcher disposed overhead;

FIG. 1c illustrates a detail of the securing mechanism for the grass catcher;

FIGS. 2a, 2b, 2c and 2d illustrate an alternate embodiment of the present invention utilizing a canvas grass catcher.

DETAILED DESCRIPTION OF THE INVENTION

Figure 2B:
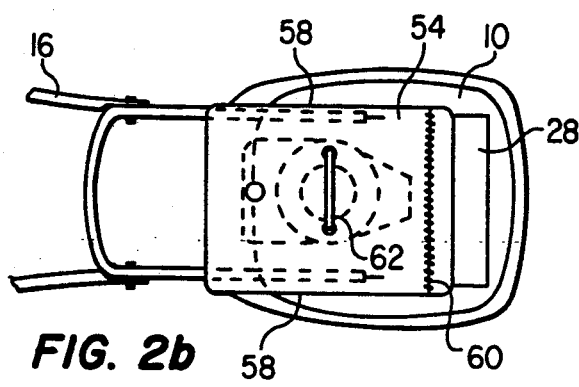

Referring now to FIGS. 1a and 1b, there are illustrated side and top views of the cutting apparatus of the present invention with the overhead grass catcher and incorporating an air-float mower. The air-float mower is comprised of a lower housing 10 which has contained therein a mower blade and an air impeller. The housing 10 supports a motor 12 which drives a cutting blade (not shown) and the air impeller (not shown) to perform both a cutting operation and to allow the housing 10 to float on a cushion of air. The grass clippings are discharged through a discharge port 14, and housing 10 is controlled by a handle 16. A kickstand 18 is provided on the handle which has two positions, illustrated in phantom. The kickstand 18 is pivoted on one end at a pivot point 20, which pivot point 20 is disposed in the middle of the handle 16. In this manner, the kickstand 18 can be pivoted upward to a retracted position to allow mowing and in the extended position to provide an upright and vertical support in contact with the ground. The operation of the mower is described in detail in U.S. patent application Ser. No. 395,799, filed Aug. 18, 1989, now abandoned, which application is incorporated herein by reference.

The discharge port 14 is connected to a flexible piece of conduit 22 for routing the grass clippings up to an outlet port 24. The conduit 22 is oriented such that clippings are discharged approximately 135 degrees from the plane of the cutting surface of the mower housing 10 and over the top of the motor 12 directed toward the central axis of the mower. A flexible portion 23 is incorporated in the conduit 22 to allow reciprocation of outlet port 24.

A support bracket 25 is provided which is attached on one end thereof at a point 26 to the handle 16. The support bracket 21 extends outward to the front of the mower and has an end cap 28 disposed thereon that extends upward perpendicular to the surface of the support bracket 25 and provides a cavity therein that is oriented rearward. The recess is approximately three inches in depth. The support bracket 25 has a platform that is parallel to the surface of the ground and is operable to receive the grass catcher. The grass catcher is generally referred to by a reference numeral 30. It is comprised of an upper portion 32 and a lower portion 34 that are bolted together at a seam 36. The lower portion 34 of the grass catcher 30 has a flange 38 disposed thereon which contains a rubber gasket 40. The rubber gasket 40 has a hole disposed therein that is sized with a diameter that is less than the diameter of the outlet port 24. In this manner, when the gasket 40 that is disposed in the flange 38 is forced over the outlet port 24, a seal is formed therewith. The end of the grass catcher 30 that is opposite to the flange 38 and forwardmost disposed with respect to mower housing 10 has an access opening disposed therein, which opening is not shown in the FIG. 1a but is disposed in the end cap 28, as will be described hereinbelow. A handle 42 is disposed on the upper side of the grass catcher 30 at the upper portion 32 and a handgrip 44 is disposed on the rearmost portion of the upper portion 32 proximate to seam 36.

When the grass catcher 30 is full, the handle 16 is pivotally raised to a vertical position, as illustrated in phantom lines. This action separates the gasket 40 and the flange 38 from the outlet port 24. A protrusion 46 on the forwardmost edge of the platform 24 is rotated downward into the soil in front of the mower housing 10.

With reference to FIG. 1c, it can be pulling on the grip 44 and rotating the flange 38 upward from contact with the handle 16, the bottom portion of the grass catcher 30 is pulled away from the support bracket. In this manner, the grass catcher 30 is separated from the support bracket 25 and the end cap 28. This allows the grass catcher 32, which has an access opening 50 on the end thereof, to be removed and the grass clippings dumped from the access opening 50. To reinstall the grass catcher 30, the procedure is reversed.

With the cutting apparatus of the present invention, a high velocity is imparted through the conduit 22 to the outlet port 24. The grass catcher 30 is essentially a sealed device with minimal air loss. In order to accommodate this type of receptacle, it is necessary to have discharge characteristics that maintain a relatively high velocity to the grass clippings in spite of some back pressure being presented thereto by the relatively sealed receptacle formed by the grass catcher 30. However, if the grass catcher 30 were a perfectly sealed enclosure, it would be very difficult to completely fill the volume. For example, if a plastic bag were utilized, it would be difficult to fill the plastic bag completely without providing some means for air to escape from the opposite end of the bag. This would require a hole of approximately one inch diameter to be formed in the surface thereof to allow the bag to completely fill. This is a distinction from conventional discharge systems for lawn mowers in that any back pressure presented to the discharge port on these conventional mowers would result in almost no discharge of clippings through the discharge port. The clippings would merely fall out the bottom portion of the mower. The cutting apparatus of the present inventions maintains a relatively high velocity in the presence of this back pressure. Therefore, even when the back pressure is increased due to filling of the grass catcher 30, discharge of clippings through the outlet port 24 is maintained.

In another important aspect of the present invention, the discharge characteristics of the cutting apparatus of the present invention allow the conduit 22 to be directed at an angle greater than 90 degrees. In this manner, the grass catcher 30 can be disposed overhead to provide maximum balance. This is especially important for a device which floats on air, as the weight imparted to the cutting apparatus from the clippings is centrally disposed over the center line of the mower. This imparts equal force to all points on the mower.

Referring now to FIG. 2a and 2b, there is illustrated an alternate embodiment of the present invention utilizing a flexible grass catcher, wherein FIG. 2a illustrates a side view of the mower with the flexible grass catcher and FIG. 2b illustrates a top view thereof. The flexible grass catcher is generally denoted by a reference numeral 54. The grass catcher 54 is fabricated from a light weight canvas material that is preformed. The grass catcher 54 has a flange 56 disposed on one side thereof that cooperates with the discharge port 24 and also is sized to receive the gasket 40 therein. The flange 56 is similar to the flange 38 in FIG. 1a. A securing rail 58 is disposed on either side of the support 25 and runs the entire length of support 25. The rail 58 is approximately one inch in height and operates to restrain the lower peripheral edges of the grass catcher 54 when disposed in position. A zipper 60 is provided on the end of the grass catcher 54 proximate to the end cap 28. Although not shown in FIG. 2a, the end of the grass catcher 54 diametrically opposite from the flange 56 extends inward to the cap 28. When the mower is not operating, the grass catcher 54 is of sufficient flexibility to have the end thereof inserted into the end cap 28. When the mower operates, air is forced through the conduit 22 into the grass catcher 54, thus inflating the grass catcher 54 and forcing the surfaces of the grass catcher 54 outward to provide a secure fit with the end cap 28 and also with the guide rail 58.

A handle 62 is provided on the upper end of the grass catcher 54. When it is desirable to empty the grass catcher 62 to remove the contents thereof, it is only necessary to tilt the handle 16 forward to disengage the flexible gasket 40 from the discharge port 24, which will then remove any positive pressure from the interior of the grass catcher 54. The grass catcher 54 then can be lifted from the support 25, due to the fact that the lack of pressure therein removes any restraint relative to the end gap 28 or the guide rails 58.

Figure 2D:
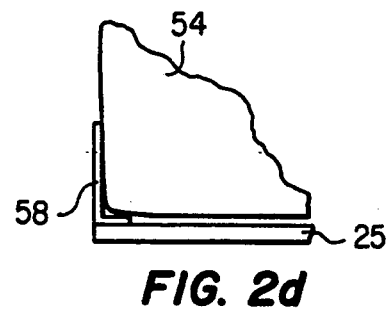
Figure 2C:
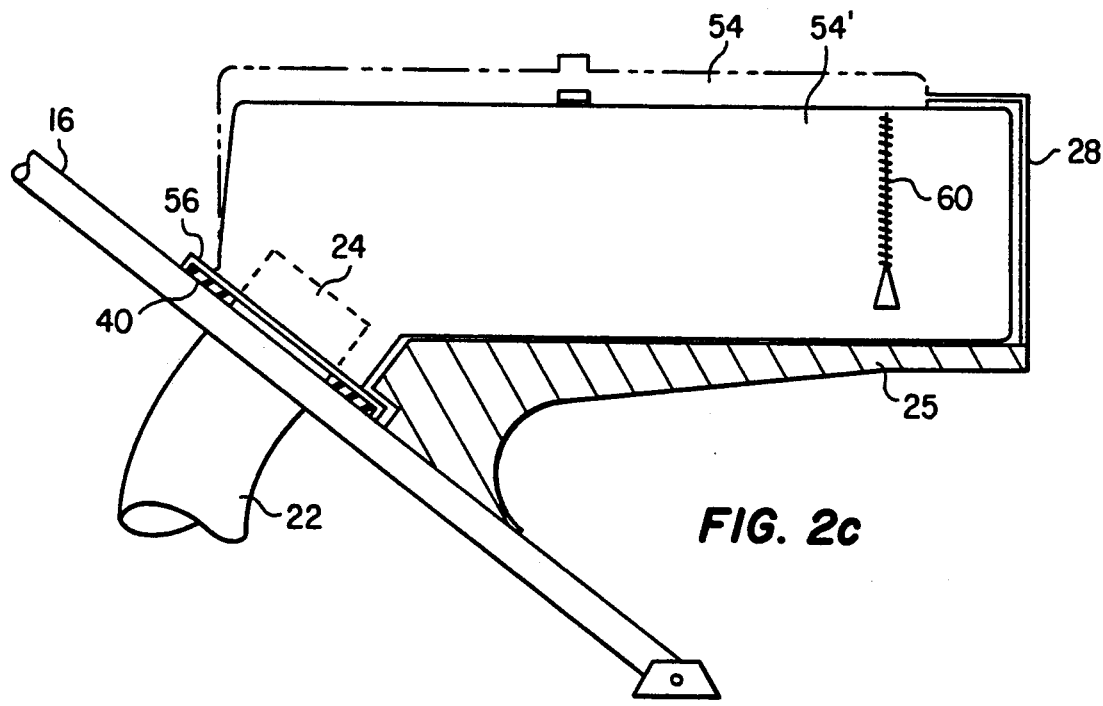

Referring now to FIG. 2c, there is illustrated a detail of the canvas bag 54 in the nonoperable position where air is not being forced therein by the outlet port 24, represented by reference numeral 54'. In this position, it can be seen that the end of the grass catcher 54' diametrically opposite to the flange 56 is easily disposed within the interior of the end cap 28, which as described above is approximately 3 inches in depth. The inflated position of the liner 54 is illustrated in phantom line. It can be seen that the inflated position as compared to the non-inflated position of the liner 54' results in the grass catcher 54 expanding outward to the phantom line position a sufficient amount to cause the end thereof diametrically opposite from the flange 56 to be securely fitted within the end cap 28.

Referring now to FIG. 2d, there is illustrated a detail of the rail 58 in cross sectional view. In this view, it can be seen that the lower corner on the side of the grass catcher 54 is held against the interior surface of the rail 58. This prevents lateral movement of the grass catcher 54 when pneumatically pressurized by the operation of the cutting apparatus of the present invention.

Figure 3:
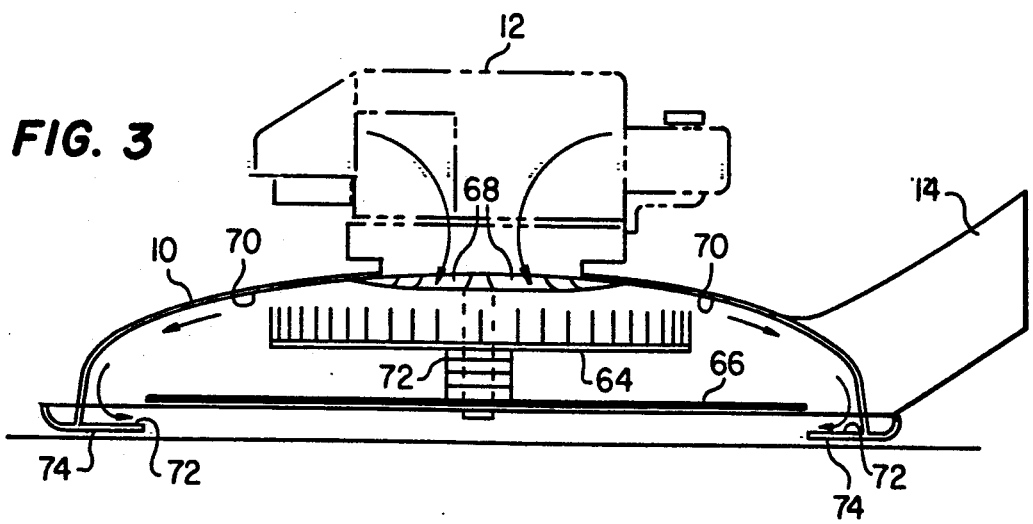
FIG. 3 illustrates a detail of the air flow through the mower housing.

Referring now to FIG. 3, there is illustrated a cross sectional diagram of the inside of the housing 10. An impeller 64, preferably comprised of light weight plastic material, is rotated on the crankshaft of the motor 12 with a rotary cutting blade 66. The impeller 64 is configured to draw air into the housing 10 through an air intake opening 68 and expel the air outwardly from the impeller 64 along an inner surface of the housing 10. The air flow within housing 10 is depicted by the arrows. Cutting blade 66 is positioned below impeller 64 within housing 10. The spacing between the impeller 64 and the cutting blade 66 is adjustable by means of shims or spacers 72. The position of the cutting blade 66 within the housing tends to determine the height of the resulting grass cut.

A relatively flat plate member 72 projects into the housing 10, adjacent to a bottom surface 74 thereof. Plate member 72 functions as a seal to direct at least some of the air flowing along the inner surface 70 of housing 10 substantially horizontally, relative to the ground, both inwardly and around plate 72, thereby substantially reducing air leakage between the ground and bottom surface 74. By retaining more air within housing 10, the air pressure within housing 10 is maintained at a relatively constant level and the lifting force acting on housing 10 is increased. Reducing air leakage from housing 10 also reduces the amount of dust and debris blown up by the escaping air, particularly when moving around shrubbery and the like. During operation, housing 10, including impeller 64 and blade 66, rides on a cushion of air which substantially facilitates the movement and handling of the cutting apparatus.

In addition to acting as a sealing means for retaining air within the housing 10, the plate member 72 provides journal support for grass cuttings, which are thrown against inner surface 70 of housing 10 by the centrifugal force of rotating blade 66. Plate member 72 cooperates with inner surface 70 of housing 10 to channel the grass cuttings into the discharge tube 14, thereby enhancing the grass catching capability of the cutting apparatus. This creates a relatively high volumetric flow of air and grass clippings. It should be understood that although the operation within the housing 10 is described with respect to air-floating, the expulsion of grass clippings through the duct with the use of the impeller and the construction of the housing 10 can be utilized with non-air-floated mowers to enhance the grass catching capability thereof.

The relatively high air pressure within housing 10 is sufficient to pneumatically discharge grass cuttings through the relatively small discharge port 14, such as a discharge port having a diameter of approximately 3 inches. The capability of discharging substantial amounts of grass cuttings at high pressures through a relatively narrow discharge duct is an important aspect of the present invention. Also, the horizontal air flow provided by plate member 72 tends to lift and straighten the grass to produce a more even cut.

The plate member 72 cooperates with the housing 10 to provide several other advantages. In addition to acting as a seal to retain air within the housing 10, the relatively flat undersurface of the plate 72 acts as a guide plate to reduce the drag on the housing 10 as it is moved across the lawn. The undersurface of the plate member 72 also prevents the bottom edge of the housing 10 from sinking too deeply into the grass, which can cause the blade to scalp the grass below the desired cutting height, particularly when the mower is first started. Furthermore, the undersurface of the plate member 72 also provides a lifting surface for air pressure to build up between the undersurface of plate member 72 and the ground, thereby enhancing the lifting action on housing 10. Plate member 72 also stabilizes housing 10 against tilting from side to side, thereby promoting a more even cut.

In summary, there has been provided a grass catcher configuration for an air-floated lawn mower or any type of lawn mower that expels grass clippings with a high volumetric flow. The grass clippings are discharged from the mower housing and routed around at an angle of greater than 90° from the plane of the cutting surface. This facilitates the disposal of the grass catcher over the central axis of the mower and allows the clippings to be discharged into the grass catcher at a high volumetric rate. The grass catcher is disposed on a platform extending over the mower with an opening at one end that fits around a discharge conduit. A flexible seal is provided therewith. The other end of the grass catcher is secured on the opposite end of the support.

Although the preferred embodiment has been described in detail, it should be understood that various changes, substitutions and alterations can be made therein without departing from the spirit and scope of the invention as defined by the appended claims.

What is claimed is:

1. A cutting apparatus for lawns with a grass catcher for clippings, comprising:
   a housing for moving along the surface of the grass;
   a cutting mechanism disposed in said housing for cutting the grass and creating clippings internal to said housing;
   a primary discharge port for interfacing between the interior of said housing and the exterior thereof for discharging clippings at an angle of less than 45° relative to the surface of the ground;
   means for discharging grass clippings from the interior of said housing out through said primary discharge port, said means for discharging tolerant to back pressure such that a high volumetric flow of grass clippings is maintained for a substantially wide range of back pressures on said primary discharge port;
   a diverter for diverting the clippings from said primary discharge port to a secondary discharge port, said secondary discharge port oriented at an angle greater than 90° relative to the surface of the grass;
   a substantially sealed receptacle having an inlet port for interfacing with said secondary discharge port, said receptacle for holding the clippings; and
   means for supporting said receptacle relative to said housing.

2. The grass catcher of claim 1 wherein said means for supporting is disposed substantially overhead said cutting mechanism to provide a balanced relationship between said housing and said receptacle when said receptacle is full of grass clippings.

3. The grass catcher of claim 1 wherein said housing operates on air pressure to maintain said housing above the surface of the grass.

4. The grass catcher of claim 1 wherein said means for discharging the grass clippings comprises:
   an impeller mounted in said housing for common rotation with said cutting mechanism; and
   a projection device for projecting into said housing to reduce the air leakage therefrom;
   said projection device being disposed on the opposite side of said cutting mechanism from said impeller.

5. The grass catcher of claim 4 wherein said projection device is comprised of a relatively flat plate member attached to a bottom part of said housing for directing at least some of the air within said housing substantially laterally relative to the support surface.

6. The grass catcher of claim 1 wherein said primary discharge port is circular shaped and said diverter comprises a conduit having an arcuate shape with two open ends, one end for interfacing with said primary discharge port and the other end thereof comprising said secondary discharge port.

7. A cutting apparatus and associated grass catcher, comprising:
   a housing for moving along the surface of the grass;
   a rotary cutting mechanism for being disposed in the housing for cutting the grass;
   a motor for being disposed on the upper surface of said housing and substantially centered with respect thereto, said motor driving said rotary cutting mechanism;
   a primary discharge port for being disposed on said housing for allowing clippings to be discharged therethrough from the interior of said housing to the exterior thereof;
   a diverter for being connected to said primary discharge port for diverting the clippings discharged by said primary discharge port to a secondary discharge port that is directed toward a plane that is disposed over said motor;
   means for discharging the clippings through said primary discharge port to said diverter;
   a support disposed in said plane over said motor; and
   a receptacle for interfacing with said secondary discharge port and disposed on said support, said receptacle for holding the grass clippings.

8. The cutting apparatus of claim 7 wherein said housing is operable to be supported by air and further comprising means for generating positive pressure within said housing.

9. The cutting apparatus of claim 7 wherein said means for generating a positive pressure also includes said means for discharging.

10. The cutting apparatus of claim 7 wherein said housing further comprises a pivoting handle that has a defined plane with first and second protrusions extending downward therefrom, first and second protrusions pivotally interfaced with said housing on either side of said mower about the center of said housing, said handle operable to pivot wherein said support is comprised of a flat member having one side thereof anchored to said handle when said handle is in an operating position, said handle in said operating position orienting the upper surface of said support substantially horizontal with said housing and disposed over said motor.

11. The cutting apparatus of claim 10 wherein said receptacle comprises:
   a container having a lower surface for interfacing with the upper surface of said support and at least one opening for receiving grass clippings;

a flange disposed over said one opening and oriented such that said flange is in a plane parallel and adjacent to the plane of said handle, said secondary discharge port oriented such that it extends through and centrally disposed with respect to said flange;

sealing means for being disposed in said flange and for sealing around said secondary discharge port; and securing means for securing said container on said support:

wherein pivoting of said handle away from said secondary discharge port allows disengagement of said secondary discharge port from said sealing means such that said container can be removed from said securing means.

12. The cutting apparatus of claim 11 wherein said container includes a lifting handle on the upper surface thereof for gripping purposes.

13. The cutting apparatus of claim 12 and further comprising a second lifting handle disposed on the side and rearmost portion of said container proximate to said flange for assisting in removing said container from said support.

14. The cutting apparatus of claim 11 wherein said securing means includes a rigid end cap disposed on the portion of said support at the forewardmost portion and on the upper surface thereof, said end cap having a cavity that faces rearward toward said handle and dimensioned to receive the forwardmost end of said container wherein said container is operable to have the end thereof inserted into said end cap and rotated downward until said flange contacts the surface of said handle.

15. The cutting apparatus of claim 14 wherein said container has an access opening disposed in the forwardmost end thereof that interfaces with said end cap such that when the forwardmost end of said container is disposed in said end cap, said end cap forming a seal therewith such that said container forms a substantially sealed volume.

16. The cutting apparatus of claim 11 wherein said diverter comprises a length of conduit being arcuate in shape having first and second ends, said first end interfaced with said primary discharge port and said second end comprising said secondary discharge port and oriented such that it is directed toward the interior of said container at said flange.

17. The cutting apparatus of claim 16 wherein at least a portion of said conduit is flexible to allow said second end of said conduit to expand outward along the longitudinal access thereof and compress along the longitudinal access thereof.

18. The cutting apparatus of claim 11 wherein said support further comprises a protrusion extending outward in a forward direction and downward, and said support is dimensioned such that when said handle is pivoted upward, said protrusion contacts the ground in front of said housing to provide an anchoring operation.

19. The cutting apparatus of claim 11 and further comprising a stabilizing device for stabilizing the handle relative to the ground when in a stationary position, said stabilizing device operable to be pivoted on said handle from a retracted to an extended position, said stabilizing device in the extended position extending downward from the pivoting point on said handle to said ground, the most distal end of said stabilizing device contacting the ground to provide an anchoring point therewith.

20. The cutting apparatus of claim 11 wherein said sealing means comprises a resilient gasket having an opening disposed therethrough, said opening dimensioned to be slightly less than the dimension of said secondary discharge port.

21. The cutting apparatus of claim 11 wherein said receptacle comprises a rigid housing.

22. The cutting apparatus of claim 11 wherein said container comprises a frameless canvas bag having at least one open end interfaced with said flange.

23. The cutting apparatus of claim 22 wherein said canvas bag includes a second opening and a zipper for sealing said second opening.

24. The cutting apparatus of claim 22 wherein said securing means includes:

an end cap having a cavity formed therein and extending upward from the surface of said support and disposed on the forwardmost portion of said support, said cavity facing rearward relative to said support, said cavity dimensioned slightly smaller than the dimension of the end of said canvas bag diametrically opposite to said flange such that the discharging operation of clippings through said secondary discharge port is operable to inflate said canvas bag to form a secure fit at the end of said canvas bag within said cavity.

25. The cutting apparatus of claim 22 wherein said securing means comprises longitudinal rails disposed along either side of said support for cooperating with the lower and outer edges of said canvas bag such that when said clippings are discharged into said canvas bag, said canvas bag expands and extends outward to contact said rails, the distance between said rails being slightly less than the dimension of said canvas bag on the lower surface thereof.

* * * * *